(12) United States Patent
Hu et al.

(10) Patent No.: US 11,414,158 B2
(45) Date of Patent: Aug. 16, 2022

(54) STABILIZER

(71) Applicant: RUSH COMPONENTS LLC, Orinda, CA (US)

(72) Inventors: Deng-Gang Hu, Orinda, CA (US); Yun-Sheng Chen, Orinda, CA (US)

(73) Assignee: RUSH COMPONENTS LLC, Orinda, CA (US)

(*) Notice: Subject to any disclaimer, the term of this patent is extended or adjusted under 35 U.S.C. 154(b) by 0 days.

(21) Appl. No.: 17/092,799

(22) Filed: Nov. 9, 2020

(65) Prior Publication Data

US 2022/0144380 A1    May 12, 2022

(51) Int. Cl.
*F16D 41/28*   (2006.01)
*B62M 9/16*   (2006.01)

(52) U.S. Cl.
CPC .............. *B62M 9/16* (2013.01); *F16D 41/28* (2013.01)

(58) Field of Classification Search
CPC .................................. B62M 9/16; F16D 41/28
See application file for complete search history.

(56) References Cited

U.S. PATENT DOCUMENTS

| 8,870,693 | B2* | 10/2014 | Shahana | B62M 9/121 474/80 |
| 9,227,696 | B2* | 1/2016 | Yamaguchi | B62M 9/126 |
| 2021/0354782 | A1* | 11/2021 | Eveleigh | B62M 9/126 |

\* cited by examiner

*Primary Examiner* — Huan Le
(74) *Attorney, Agent, or Firm* — Muncy, Geissler, Olds & Lowe, PC

(57) ABSTRACT

A stabilizer includes a receiving device, a guide plate element for connection with a chain, and a clutch device. The guide plate element is movably mounted on the receiving device and performing a rotation state through an elastic element. The clutch device is mounted on the receiving device and connected with the guide plate element and used for providing one-way resistance. When a vehicle body jounces, the guide plate element rotates upwardly under force, the chain is tensioned, and the clutch device is in a free rotation state. When the guide plate element moves towards an opposite direction under force, the clutch device provides one-way resistance, so that the guide plate element can maintain a tensioning state of the chain for a longer time, and the effect of stabilizing the chain is achieved.

4 Claims, 4 Drawing Sheets

STABILIZER

FIELD OF THE INVENTION

The invention belongs to the technical field of bicycles, and particularly relates to a stabilizer.

BACKGROUND OF THE INVENTION

Bicycles, also known as bikes or cycles, are typically two-wheeled small land vehicles. After a person rides on the bicycle, a pedal is taken as power. The bicycle is a green and environment-friendly transportation tool, and the driving of the bicycle needs cooperation of a chain and a chain wheel.

However, when the bicycle is actually ridden, especially when it is ridden on an uneven road, a rear derailleur and a chain might shake, so that the chain easily falls off from the guide wheel, and the danger of chain jamming occurs.

The conventional stabilizer only functions as a tensioning spring through an elastic force of a spring, but under the elastic force of the spring in the resetting process, a resetting force is large, and the chain is easy to fall off.

SUMMARY OF THE INVENTION

The embodiment of the invention provides a stabilizer and aims to solve the problem that a chain in the prior art is easy to fall off.

The embodiment of the invention is realized by providing a stabilizer, wherein the stabilizer comprises a receiving device, a guide plate element, and a clutch device. The guide plate element is connected with a chain, and the guide plate element is movably mounted on the receiving device and performing a rotation state through an elastic element. The clutch device is mounted on the receiving device, connected with the guide plate element, and provides one-way resistance in a movement process of the guide plate element relative to the receiving device.

The embodiment of the invention further provides a bicycle, which comprises the stabilizer, a vehicle body and wheels, wherein the wheels are rotatably mounted on the vehicle body through wheel shafts, and the stabilizer is mounted on a rear derailleur lower seat of the vehicle body.

According to the stabilizer provided by the embodiment of the invention, when the vehicle body jounces during riding, the guide plate element rotates towards an upper end direction of the vehicle body under force to tension the chain, and the clutch device is in a free rotation state. When the guide plate element moves towards an opposite direction under force, the clutch device provides one-way resistance, so that the guide plate element can maintain the tensioning state of the chain for a long time. Therefore, the effect of stabilizing the chain is achieved.

DETAILED DESCRIPTION OF THE PREFERRED EMBODIMENTS

Specific implementations of the invention are described in detail below.

Figure 1:
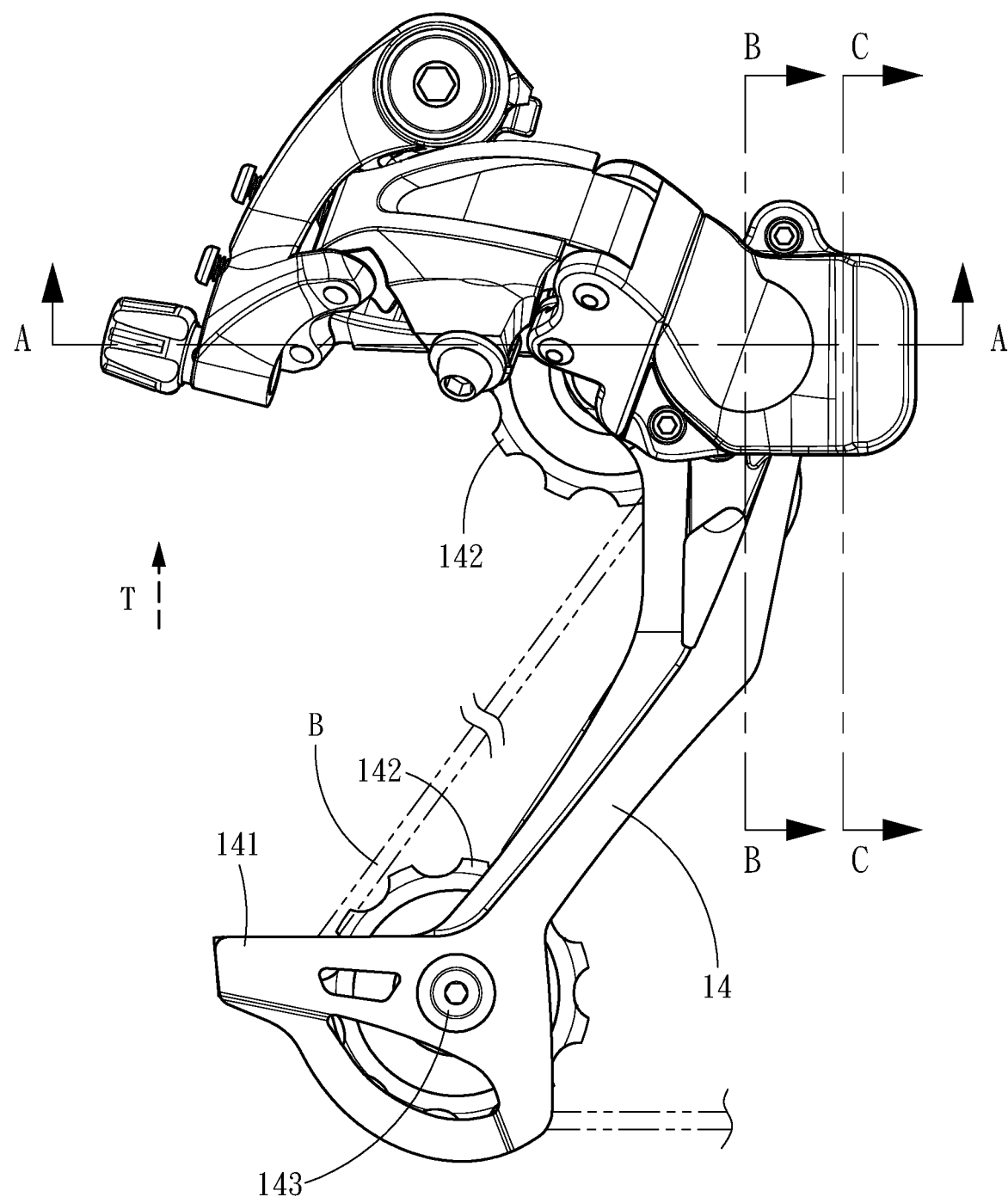
FIG. 1 is a front view of a stabilizer according to an embodiment of the present invention.
Figure 2:
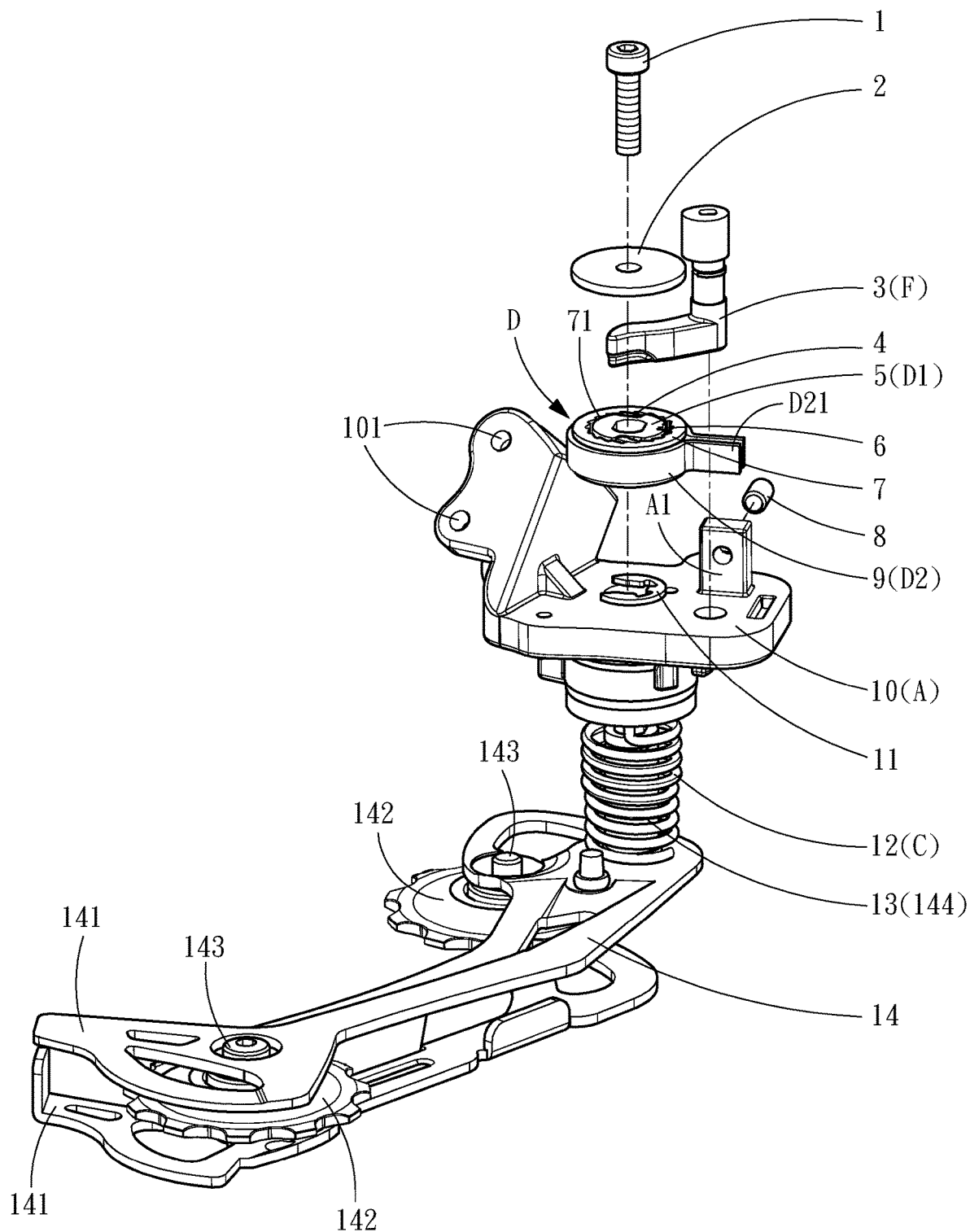
FIG. 2 is a structural exploded view of a stabilizer according to the embodiment of the present invention.
Figure 3:
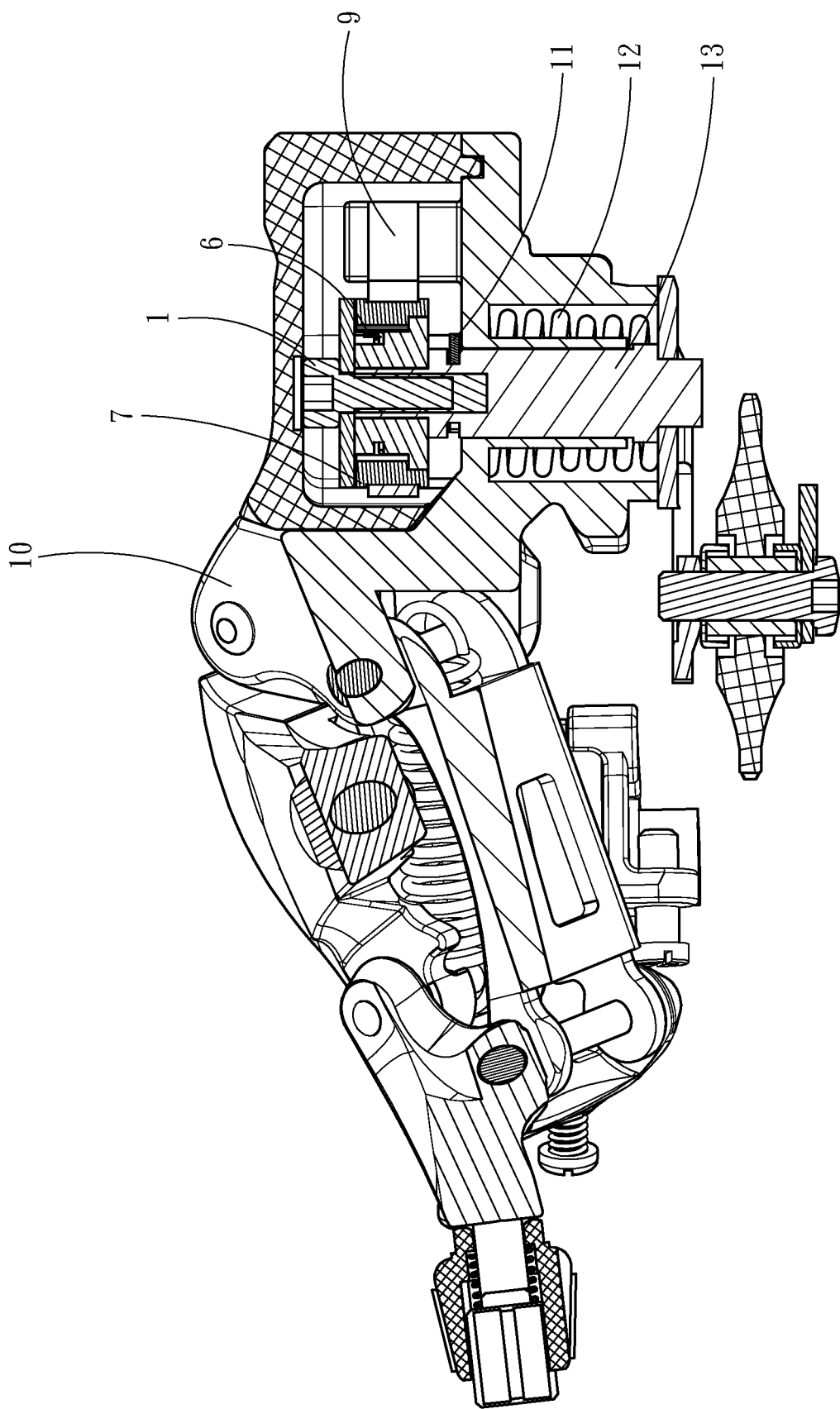
FIG. 3 is a sectional view in the direction A-A in FIG. 1.
Figure 4:
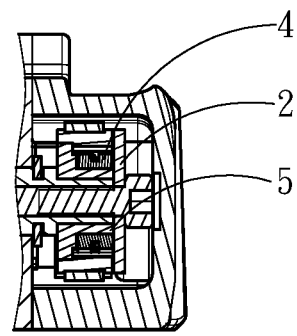
FIG. 4 is a sectional view in the direction B-B in FIG. 1.
Figure 5:
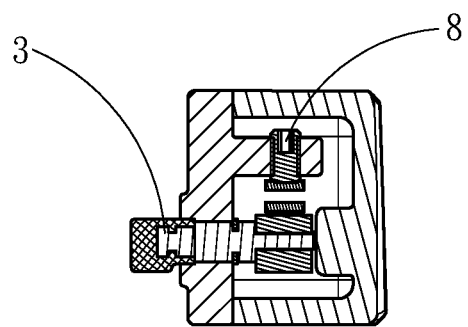
FIG. 5 is a sectional view in the direction C-C in FIG. 1.

As shown in FIG. 1 and FIG. 2, a stabilizer according to an embodiment of the present invention comprises a receiving device A; a guide plate element 14 connected with a chain B (only schematically depicted in FIG. 1), the guide plate element 14 movably mounted on the receiving device A and performing a rotation state through an elastic element C; and a clutch device D mounted on the receiving device A, connected with the guide plate element 14 and providing one-way resistance in a rotating process of the guide plate element 14 relative to the receiving device A. In the embodiment, the guide plate element 14 is of conventional construction, which changes a direction of the chain B.

In the embodiment, when the vehicle body jounces during riding, the guide plate element 14 rotates towards an upper end direction T of the vehicle body under force to tension the chain B, and the clutch device D is in a free rotation state. When the guide plate element 14 moves in an opposite direction under force, the clutch device D provides a one-way resistance so that the guide plate element 14 can maintain a tension state of the chain B for a longer period of time. Thereby, the effect of stabilizing the chain B is achieved.

In an embodiment as shown in FIG. 1, the guide plate element 14 and the clutch device D are provided on both sides of the receiving device A and are connected by a connecting member 144 penetrating through the receiving device A.

In another embodiment (not shown in the drawings), the guide plate element 14 and the clutch device D are arranged on one side of the receiving device A and are connected by a connecting member 144. In the actual use process, the mounting position can be selected according to different requirements.

As to an embodiment, the elastic element C is a torsion spring 12, two ends of which are fixedly connected to the guide plate element 14 and the receiving device A, respectively, for providing a rotational force during rotation of the guide plate element 14 with respect to the receiving device A.

Specifically, the guide plate element 14 includes two clamping plates 141 and two sprockets 142 mounted between the two clamping plates 141. The two sprockets 142 are rotatably mounted between the two clamping plates 141 by bearings 143, and the two sprockets 142 serves for receiving and guiding during a particular use.

As an embodiment refer to FIG. 1, FIG. 3, FIG. 4 and FIG. 5, the clutch device D comprises a clutch assembly D1 and a limit assembly D2. The clutch assembly D1 is movably mounted in the limit assembly D2, and sliding friction is carried out between the limit assembly D2 and the clutch assembly D1. During actual use, the limit assembly D2 is in contact with an outer wall of the clutch assembly D1, and when the clutch assembly D1 slides relative to the limit assembly D2, a friction force is generated between the clutch assembly D1 and the clutch assembly D1, so that the overall rotation of the clutch assembly D1 is hindered, and the rotation speed is reduced. It is advantageous that the rotation speed of the guide plate element 14 connected with the clutch assembly D1 is reduced, and the tensioning time of the chain B in a bumping process is prolonged.

As an embodiment refers to FIG. 1, FIG. 3, FIG. 4 and FIG. 5, the limit assembly D2 is detachably mounted on the receiving device A, and the limit assembly D2 is further provided with an adjusting mechanism F. The adjusting mechanism F is used for adjusting a passing area of the limit assembly D2 so as to change a friction force between the clutch assembly D1 and the limit assembly D2 in order to meet different use requirements.

Specifically, the limit assembly D2 is arranged in an annular structure, and one end of the limit assembly D2 is an opening. An extension piece D21 is mounted at the opening of the limit assembly D2. The extension piece D21 is connected with a mounting block A1 arranged on the receiving device A through the adjusting mechanism F, and the limit assembly D2 is tightened through the adjusting mechanism F, so that a contact area of the clutch assembly D1 and the limit assembly D2 is changed.

Further, the limit assembly D2 comprises a locking piece 8 and a wrapping ring 9. The locking piece 8 and the wrapping ring 9 are mounted on the mounting block A1, and the wrapping ring 9 is made of a metal material and has certain elasticity so as to meet the adjustment of the contact area between the clutch assembly D1 and the limit assembly D2.

Furthermore, the adjusting mechanism F includes a adjustment switch 3 mounted at one end of the wrapping ring 9 for providing an abutting force to the wrapping ring 9 so as to change a passing area of an inner side of the wrapping ring 9, thereby realizing tightening or loosening adjustment of the limit assembly D2. Preferably, the adjustment switch 3 is a cam or an eccentric. Preferably, the locking piece 8 is a screw or bolt.

In an embodiment, the clutch assembly D1 comprises a movable body 5 connected with the connecting member 144, an outer side of the movable body 5 is sleeved with a receiving sleeve 7 contacting with the limit assembly D2, and the movable body 5 is provided with a one-way limit assembly, including a movable member 4 and an elastic member 6, for enabling the movable body 5 and the receiving sleeve 7 to rotate in one direction. In use, due to the action of the one-way limit assembly, when the movable body 5 rotates in one direction, the receiving sleeve 7 does not rotate along with the movable body 5; and when the movable body 5 moves in an opposite direction, the movable body 5 drives the receiving sleeve 7 to rotate therewith.

Specifically, in an embodiment, the one-way limit assembly comprises at least one movable member 4 and at least one elastic member 6. The movable member 4 is rotatably mounted on the movable body 5 and is reset through the elastic member 6. One end, facing to the receiving sleeve 7, of the movable member 4 is matched and clamped with an oblique tooth 71 arranged on an inner wall of the receiving sleeve 7 so as to realize the one-way rotation of the movable body 5 relative to the receiving sleeve 7. Here, the structure is similar to that of a ratchet mechanism, and therefore the present application will not be described in detail.

In order to ensure the stability of rotation between the movable body 5 and the receiving sleeve 7, the receiving sleeve 7 is provided with a pressing member 2 through a fixing piece 1 as one embodiment. The fixing piece 1 penetrates through the pressing member 2 and the movable body 5 and is fixed with the connecting member 144, so that the movable body 5 and the connecting member 144 are fixed, and the movable body 5 and the guide plate element 14 rotate synchronously. Preferably, the fixing piece 1 is a fixing pin or bolt, as long as the fixing requirement is satisfied, which is not limited thereto. Preferably, the connecting member 144 is provided with a snap spring 11 where the connecting member 144 is extending through the receiving device A and connected to the movable body 5, and the snap spring 11 is effective to prevent rotational deflection of the connecting member 144. Further, the connecting member 144 is a rotating shaft 13 or a rotating rod.

In one embodiment, the receiving device A comprises a mounting seat 10, wherein a mounting hole 101 for fixing with the vehicle body is formed in the mounting seat 10, so that the whole stabilizer is fixed with the vehicle body to increase the stability.

Further, the invention provides a bicycle, which comprises the stabilizer as described in the aforesaid embodiments, and further comprises a vehicle body and wheels. The wheels are rotatably mounted on the vehicle body through wheel shafts, and the stabilizer is mounted on a rear derailleur lower seat of the vehicle body, so that the stability of the chain B is effectively improved, and the chain B is prevented from falling off.

What is claimed is:

1. A stabilizer, comprising:
a receiving device;
a guide plate element, connected with a chain, the guide plate element movably mounted on the receiving device and performing a rotation state through an elastic element; and
a clutch device, mounted on the receiving device and connected with the guide plate element by a connecting member, the clutch device is configured to provide an one-way resistance in a rotating process of the guide plate element relative to the receiving device, wherein the clutch device comprises:
a limit assembly, detachably mounted on the receiving device, and the limit assembly is an annular structure; and
a clutch assembly, movably mounted in the limit assembly and rotated relative to the limit assembly to generate a friction force, the clutch assembly comprising a receiving sleeve, a movable body, at least one movable member and at least one elastic member, wherein the receiving sleeve sleeves on an outer surface of the movable body and contacts with the limit assembly, the movable body is connected with the connecting member, the at least one movable member is rotatably mounted on the movable body to force the receiving sleeve being rotated in one-way relatively to the limit assembly, and the at least one movable member is reset by the elastic member, and wherein the receiving sleeve comprises a pressing member mounted on the receiving sleeve through a fixing piece, and the fixing piece penetrates through the pressing member and the movable body and is fixed with the connecting member.

2. The stabilizer according to claim 1, wherein the guide plate element and the clutch device are provided on one side or both sides of the receiving device.

3. The stabilizer according to claim 1, wherein the limit assembly is detachably mounted on the receiving device, and an adjustment switch is provided on the limit assembly, the adjustment switch is selected from one of a cam and an eccentric, and is configured to adjust a passing area of the limit assembly to change a magnitude of a frictional force between the clutch assembly and the limit assembly.

4. The stabilizer according to claim 1, wherein one end of the movable member facing the receiving sleeve is engaged and clamped with an oblique tooth provided on an inner wall of the receiving sleeve.

* * * * *